United States Patent [19]

Martel

[11] Patent Number: 5,070,399

[45] Date of Patent: Dec. 3, 1991

[54] LIGHT COLOR AND INTENSITY MODULATION SYSTEM

[76] Inventor: Alain Martel, P.O. Box 2412, Ste-Adele, Province of Quebec, Canada, J0R 1L0

[21] Appl. No.: 631,489

[22] Filed: Dec. 21, 1990

Related U.S. Application Data

[63] Continuation-in-part of Ser. No. 473,470, Feb. 1, 1990, abandoned.

[51] Int. Cl.$^5$ .............................................. H04N 1/46
[52] U.S. Cl. .................................. 358/81; 84/464 R; 340/815.11
[58] Field of Search ........................ 358/81; 84/464 R; 381/48; 340/815.11

[56] References Cited

U.S. PATENT DOCUMENTS

| | | | |
|---|---|---|---|
| 3,639,691 | 2/1972 | Beninghof, Jr. | 381/48 |
| 3,804,503 | 4/1974 | Sissom | 84/464 |
| 4,128,846 | 12/1978 | Robinson, Jr. | 358/81 |
| 4,185,276 | 1/1980 | Benson | 340/815.11 |
| 4,378,466 | 3/1983 | Esser | 84/464 R |
| 4,614,942 | 9/1986 | Molinaro | 340/815.4 |
| 5,019,898 | 5/1991 | Chao et al. | 358/81 |

Primary Examiner—Victor R. Kostak
Assistant Examiner—Jeffrey J. Murrell
Attorney, Agent, or Firm—ROBIC

[57] ABSTRACT

A color and intensity modulation system has an output to be connected to a color light projector and an input to receive a hue control signal and an intensity control signal including at least one modulation frequency component F. The system comprises a color scaling device, receiving in use the hue signal, the color scaling device producing a plurality of color component signals, the plurality of color component signals being supplied as the output to the color light projector, and an intensity control device, receiving in use the intensity control signal, the intensity control device comprising a low frequency oscillator whose output is an intensity modulation signal for varying an intensity of the plurality of color component signals between a preset minimum and a preset maximum value, the oscillator having a frequency responsive to the at least one modulation frequency component F of the intensity control signal, the plurality of color component signals to control in use the projector. The projected light can have a relaxing visual effect.

12 Claims, 4 Drawing Sheets

| F | D | I | H | |
|---|---|---|---|---|
| 50 | 50 | 100 | 40 | example 1 |
| 5 | 100 | 50 | 100 | example 2 |
INPUT
FIG. 3
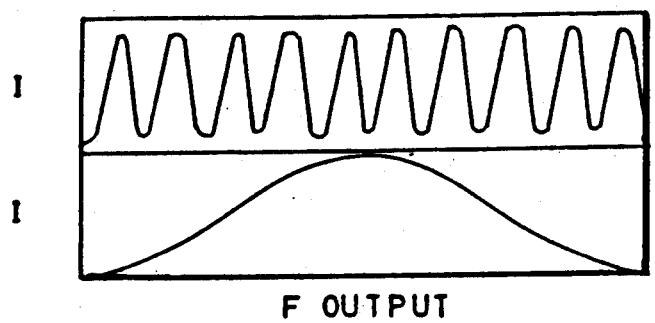
F OUTPUT
FIG. 4
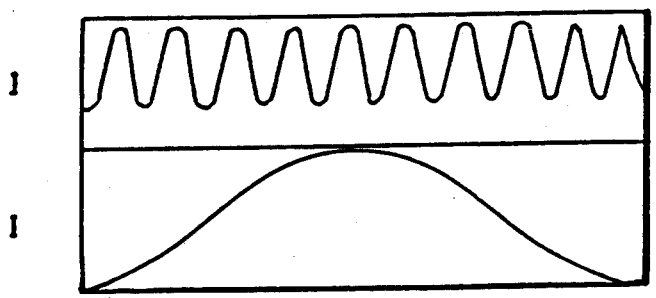
D OUTPUT
FIG. 5
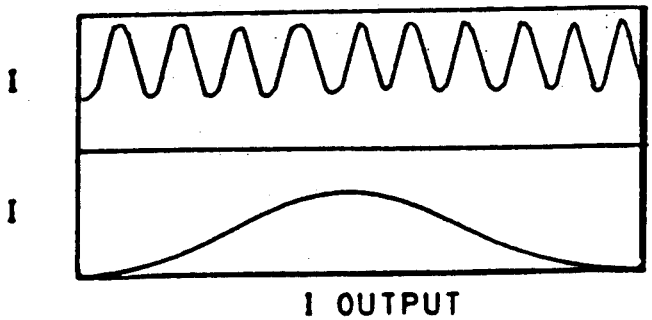
I OUTPUT
FIG. 6

LIGHT COLOR AND INTENSITY MODULATION SYSTEM

This application is a continuation-in-part of U.S. patent application Ser. No. 473,470 filed Feb. 1, 1990, now abandoned.

BACKGROUND OF THE INVENTION

The present invention relates to a light color and intensity modulation system for use with a color light projector.

It is well known that when exposed to a light or sound pulsation with a frequency falling in the range of human brainwave (about 2 Hz to 20 Hz), a subject will have a tendency to himself generate brainwaves of the same frequency through an effect known as entrainment or photic driving. A further discussion of this effect can be found in the book, "Megabrain", by M. Hutchison (pages 224-227, 1976, ISBN 0-345-34175-9). Specific brainwave frequencies being associated with different mind states, the subject may indirectly be led towards these mind states through this brainwave induction. A light projection system can be used to generate light color an intensity pulsations in the brainwave frequency range (2 Hz to 20 Hz).

There currently exists light pulsation devices for the purpose of entrainment or photic driving, which usually use small lights within goggles applied close to the eyes. Of course, the goggles obstruct the vision of the subject and can be uncomfortable.

It is an object of the present invention to provide a light color and intensity modulation system which can project the light pulsation over the whole environment surrounding the subject. It is another object of the invention to provide a system of the above-mentioned type, wherein the light color is pulsated to produce new induction effects.

SUMMARY OF THE INVENTION

According to the present invention there is provided a light color an intensity modulation system having an output to be connected to a color light projector and an input to receive a hue (color) control signal and an intensity control signal including at least one modulation frequency component F. The system comprises color scaling means receiving in use the hue signal. The color scaling means produce a plurality of color component signals that are supplied as the output to the color light projector. The system comprises intensity control means receiving in use the intensity control signal. The intensity control means comprise a low frequency oscillator whose output is an intensity modulation signal for varying an intensity of the plurality of color component signals between a preset minimum and a preset maximum value, the oscillator having a frequency responsive to the at least one modulation frequency component F of the intensity control signal, the plurality of color component signals to control in use the projector.

According to the invention, the plurality of color component signals preferably comprises three signals, so that in use three primary colors used by the projector may be modulated to obtain any color of the visible spectrum.

BRIEF DESCRIPTION OF THE DRAWINGS

Other objects and features of the present invention will become clear by way of the following detailed description of a preferred embodiment taken in conjunction with the drawings wherein:

FIG. 3 shows a table of the parameters F, D, I and H as chosen in examples 1 and 2;

FIGS. 4 through 6 show graphically the outputs of devices 1, 5 and 7 respectively of FIGS. 1 and 2 for the cases of examples 1 and 2.

DETAILED DESCRIPTION OF THE PREFERRED EMBODIMENTS

Figure 1:
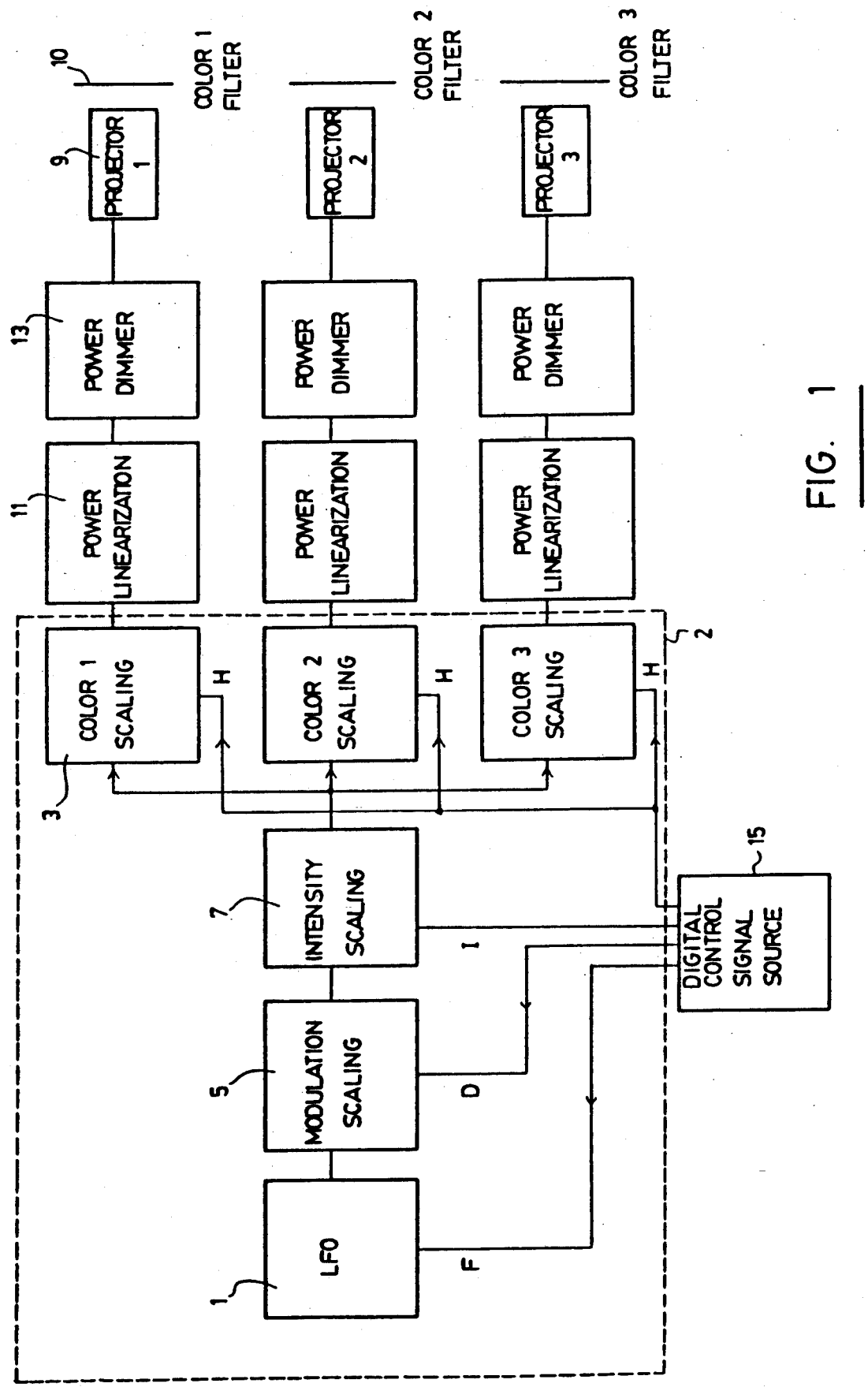
FIG. 1 is a schematic block diagram of a light color and intensity modulation system according to the preferred embodiment.

As shown in FIG. 1 the light color and intensity modulation system 2 receives an input from control signal source 15 and has three outputs connected to power linearization circuits 11. The control signal source 15 provides a modulation frequency component signal F, a modulation depth component signal D and intensity component signal I, and a hue signal H.

As is well known in the art, the hue signal represents the color to be output and the color scaling circuits 3 are provided for each color component to produce each a color component signal. The modulation frequency component F is fed to the low frequency oscillator 1. Low frequency oscillator 1 generates a low frequency oscillating waveform f (such as a sign wave) with a frequency in the range of 0.01 to 20 Hz and an amplitude which ranges from 0 to 1 on a unit scale. In the preferred embodiment, all control signals are digital.

The modulation depth component signal D is the second component of the intensity control signal and is fed to modulation scaling device 5. The modulation scaling device 5 scales the amplitude of the waveform generated by the low frequency oscillator in order to provide a modulating signal of adjustable depth D, such that the output signal of modulation scaling device 5 is the difference between 1 and the product of component D and the output of oscillator 1, f. The output of the modulation scaling device 5 is therefore between 0 and unity.

The final intensity processing step according to the preferred embodiment is provided by intensity scaling device 7 which receives intensity factor component I of the intensity control signal. The output of device 7 is the product of intensity factor component I and the output of device 5. Of course the maximum output of device 7 is determined by the magnitude of intensity factor component I, which in the preferred embodiment is set to 1.

In summary, the intensity control means including devices 1, 5, 7 operate as follows:

| Input Range | Control Function | Output range |
|---|---|---|
| F∈ [0.01, 20] | f(2π *F*t) | [0, 1] |
| D∈ [0, 1] | 1-D*f | [0, 1] |
| I∈ [0, 1] | I*(1-D*f) | [0, I] |

The output of the intensity scaling device 7 is fed as input to each color scaling device 3.

The details of the circuits of the low frequency oscillators, modulation scaling device 5 and intensity scaling device 7 are all well known in the art and therefore no detailed description of them is given herein.

The circuit elements enclosed within the dotted line box 2 comprise the light color and intensity modulation system according to the preferred embodiment.

Power linearization devices 11 each receive input from color scaling devices 3 and produce an output signal which has been scaled by a linearizing function that takes into account the perceived brightness to dissipated power curve of the light projectors used. The scaling function of the power linearization devices 11 depends on the particular luminance to dissipated power curve of the light bulbs used in the projectors 9, and the luminance to subjective perceived brightness curve for a typical human subject (as already known in the lighting industry).

Power dimmers 13 each represent a standard electronic circuit well known in the art which delivers the required power to each projector 9. The power dimmers 13 each receive the output signal from a respective power linearization device 11, to produce a variable power, color projector lamp output signal. When the power dimmer devices 13 are used with common AC power source, the devices 13 will typically comprise a Triac chopping the AC source wave at a variable phase during each cycle, with the controlling device determining the proper phase for the required power output.

Each of the projectors 9 and color filters 10 are used to produce by combination a color of the visible spectrum. In the preferred embodiment, all projectors 9 shine light through the color filters 10 to strike the same surface area. This surface area may be a projection screen or even a blank wall.

Figure 2:
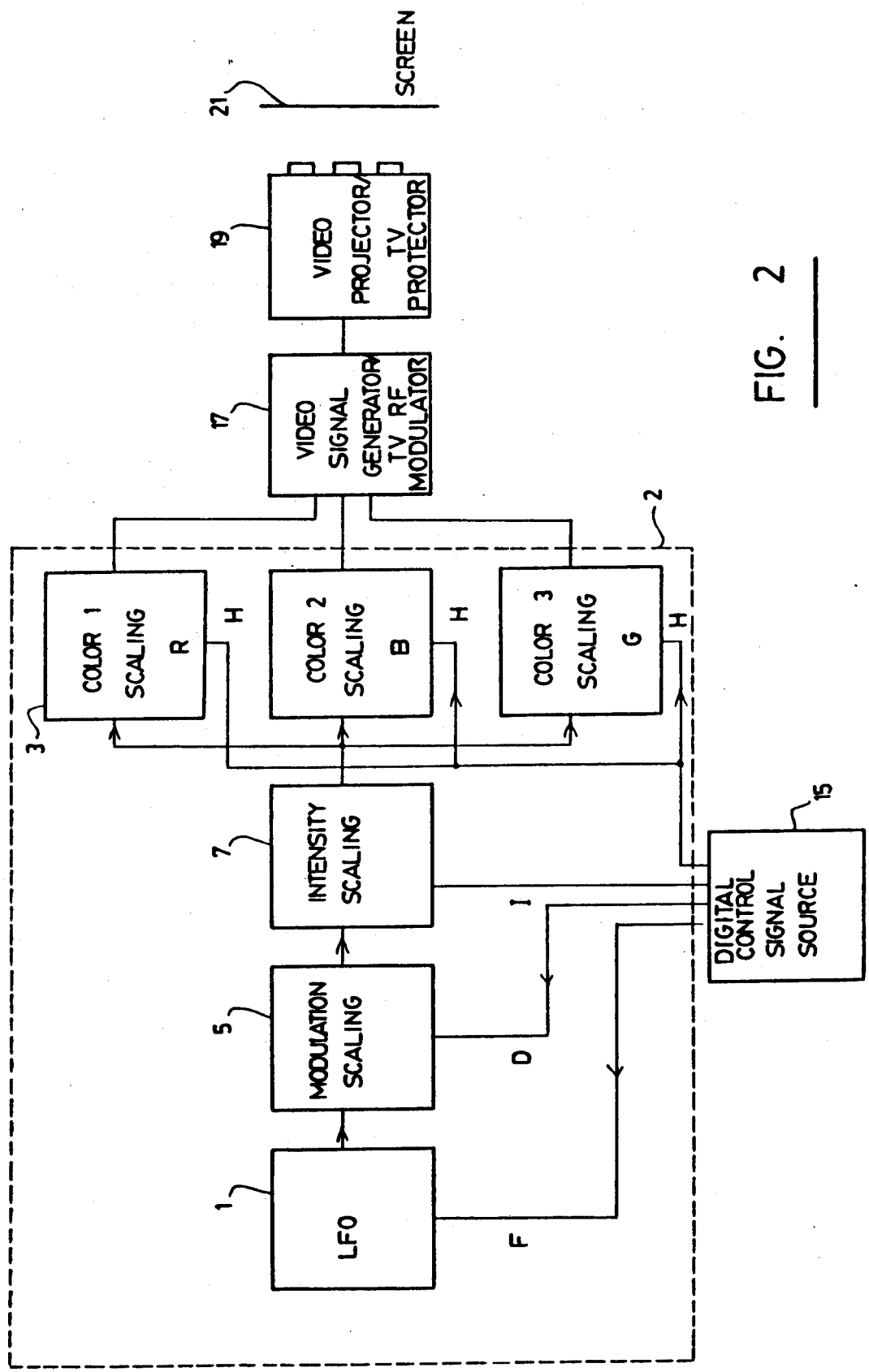
FIG. 2 shows a schematic block diagram of the light color and intensity modulation system of FIG. 1 connected to an RGB screen projection television unit.

As shown in FIG. 2 the output of the color scaling devices 3 are connected to a video signal generator 17 having an output connected to a video projector 19. Video projector 19 is used to project a solid full screen image on screen 21 whose color and intensity is varied by the system 2. The output of video signal generator 17 may be an RF modulated video signal or an RGB monitor signal.

In the preferred embodiment disclosed hereinabove, the control signal source is a source of digital data which can be any source of prerecorded digital data (e.g. computer, MIDI sequencer, or audio-encoded digital data track on an audio recording device). As the invention may be used in conjunction with an audio system to provide a multi-sensory automatic relaxation system, the audio soundtrack and digital data track can be for example recorded on a common multi-track audio recorder (DAT, Cassette or Hi-Fi VCR). The control signal source may also comprise an analog data reader device coupled to an analog to digital converter (ADC) alone or in addition to a digital data source, and can also be able to switch between analog and digital.

Thus, by way of example by using a MIDI Port as a digital Port and assigning MIDI Note codes to the H, I, F and/or D signals according to specific algorithms, a direct translation of musical notes to color projection is possible.

By assigning very slow waveforms (with periods of several seconds to several minutes) or slowly varying random values to the H, I, F and/or D signals, a perpetually varying light projection may also be obtained. A number of such projector triads can be set up around a room to create a soft ambient light effect.

The system according to the invention as described hereinabove can be used to generate light intensity pulsations in the brainwave frequency range (F$\epsilon$ [2 Hz, 20Hz]), as well as color pulsations through the H signal. By contrast with light pulsation devices that already exist for this purpose, this system can project the light pulsation over the whole environment surrounding the subject. Modulating the color of the pulsation may also lead to new induction effects.

The digital parameters F, D, I and H generated by the Control Signal Source 15 can be produced in a variety of ways. They can simply originate from 4 potentiometers, giving out 4 control voltages each converted into a digital signal through an ADC (Analog-to-Digital Converter). Or, they can originate from a standard digital interface such as MIDI (Musical Instrument Digital Interface). This second way is illustrated with a few examples:

In a given MIDI implementation of the invention, each of the 4 parameters F, D, I and H are associated with a specific MIDI messages, such as a MIDI Continuous Controller (C.C.) message. For example, we can select:
* F value sent through MIDI C.C. #1
* D value sent through MIDI C.C. #2
* I value sent through MIDI C.C. #3
* H value sent through MIDI C.C. #4

MIDI C.C. messages can be programmed and sent to the invention through any standard MIDI sequencer device, such as the numerous software packages available for the IBM-PC, Apple, Amiga or Atari personal computers, or any stand-alone MIDI sequencer unit.

In MIDI, C.C. messages can have a value varying between 0 and 127 (a 7 bit message). We can, for example, map a 0-100 MIDI range onto the 0-1 range of the invention parameters F, D, I and H (in the case of the H Hue parameter, the 0-100 MIDI range will sweep through 100 colors of the rainbow, from red to yellow, to green, to blue and to violet).

Figure 7:
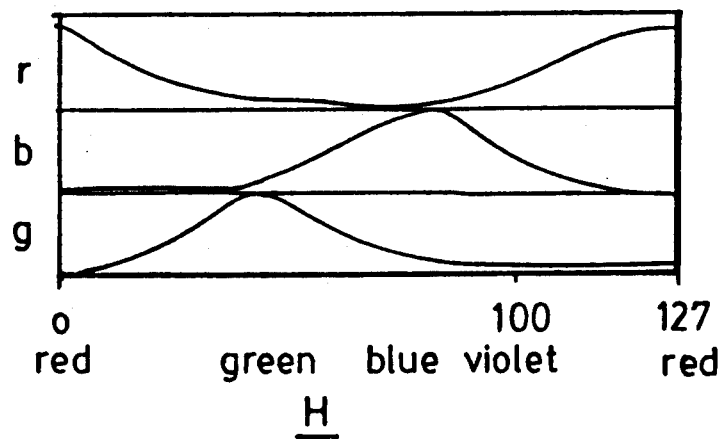
FIG. 7 shows graphically the outputs of three color scaling devices 3 of FIGS. 1 and 2 as the H parameter varies from 0 to 127 in the preferred embodiment.

As shown in FIG. 7, in the preferred embodiment the color scaling devices 3, which include three separate color scalers R, B and G, amplify the output of intensity scaling device 7 (see FIG. 6) by a factor determined from each device 3 in accordance with FIG. 7. Although devices 3 can be arranged such that a range of digital inputs from 0 to 100 provides the full spectrum of colors, the remaining portion of the 7 bit MIDI code can be used to provide a continuous change in color from violet back to red.

Using a 0 to 100 scale, the low frequency oscillator device 1 will output an analog signal (sinusoidal for, example) of a frequency between 0.01 Hz to 20 Hz as the digital input F varies between 0 and 100. The analog signal is fed to the depth modulation device 5 and is used to amplify an analog conversion of the D parameter, in such a manner that when the amplified signal is subtracted from a preset voltage signal, the depth modulation scale signal described above is obtained for output to the intensity scaling device 7. Device 7 then amplifies an analog conversion of the I parameter to produce the desired intensity modulation signal for output to the color scaling devices 3 as described above.

The outputs created by devices 1, 5 and 7 are shown in FIGS. 4, 5 and 6 respectively in the cases of examples 1 and 2. The intensity output signals are shown on a 0 to 1 unit scale.

Following are some examples of MIDI message sequences that can be sent, and their effect on the invention:

EXAMPLE 1

To create a full intensity, green display pulsating at 10 Hz with half modulation depth, the following MIDI messages are sent;
C.C #1, value 50→F=0.5 (corresponding to 10 Hz in the given implementation)
C.C. #2, value 50→D=0.5 (50% modulation depth)
C.C. #3, value 100→I=1.0 (100% intensity)
C.C. #4, value 40→H=0.4 (corresponding to green in the given implementation)
Such a display could be used to induce brainwave entrainment in the alpha brainwave range.

EXAMPLE 2

To create a low intensity, violet display pulsating very slowly at full modulation depth, the following MIDI messages are sent:
C.C #1, value 05→F=0.05 (corresponding to 1 Hz in the given implementation)
C.C. #2, value 100→D=1.0 (100% modulation depth)
C.C. #3, value 50→I=0.5 (50% intensity)
C.C. #4, value 100→H=1.0 (corresponding to violet in the given implementation)
Such a display could be used to induce a specific mood as a part of a relaxation program.

Series of displays such as these can be entered on the MIDI sequencer device, and sent at predetermined intervals to create complex light programs. Such intervals may be relatively short and the changes to the parameters incremental to cause a gradual change either in intensity modulation or color. For example, incrementing only the H parameter in example 1 by 1 once a second would change the color from green to blue to violet over the course of one minute (60 increments). A solid color projection can always be obtained by setting the D parameter to zero. Fading is achieved by gradually setting the I parameter to zero. Abrupt changes in color or intensity can correspond to desired changes in mood during the course of a complex light program.

The system according to the invention can further be coupled with a complete multi-sensory system, including sound and other parameters such as odors, video projection, laser projection, and vibrations transmitted to the body through sound resonators. Such a system can be installed in a special-purpose light-proof, sound-proof room, to be used as an automatic relaxation system, or for other specific therapeutic purposes. The system can be computer-controlled, with the programmable elements (light projection, sound spatialization, etc) driven by some source of prerecorded digital data (e.g. computer, MIDI sequencer, or audio-encoded digital data track on an audio recording device). The audio soundtracks and digital data track can for example be recorded on a common multi-track audio recorder (DAT, Tape, Cassette or Hi-Fi VCR).

It is to be understood that the above description of the preferred embodiment of the invention is not intended to limit the scope of the present invention as defined in the appended claims.

I claim:

1. A light color and intensity modulation system having an output to be connected to a color light projector and an input to receive a hue control signal and an intensity control signal including at least one modulation frequency component F, said system comprising:
color scaling means for receiving said hue control signal, said color scaling means producing a plurality of color component signals, said plurality of color component signals being supplied as said output to said color light projector; and
intensity control means for receiving said intensity control signal, said intensity control means comprising a low frequency oscillator whose output is an intensity modulation signal for varying an intensity of said plurality of color component signals between a preset minimum and a preset maximum value, said low frequency oscillator having a frequency responsive to said at least one modulation frequency component F of said intensity control signal, said plurality of color component signals for controlling said projector.

2. A light color and intensity modulation system as claimed in claim 1, wherein said plurality of color component signals are three in number, each of said color component signals corresponding to a primary color so that three primary colors used by said projector may be modulated to obtain any color of the visible spectrum.

3. A light color and intensity modulation system as claimed in claim 2, further comprising power linearization means to scale an unscaled amplitude of said color component signals to produce a scaled amplitude, so that a relation between the unscaled amplitude and an intensity of corresponding colors projected by said color light projector is linear.

4. A light color and intensity modulation system as claimed in claim 3, further comprising video signal generating means to convert said color component signals into an RGB monitor signal.

5. A light color and intensity modulation system as claimed in claim 3, further comprising television RF modulator means to convert said color component signals into an RF modulated video signal.

6. A light color and intensity modulation system as claimed in claim 2, further comprising video signal generating means to convert said color component signals into an RGB monitor signal.

7. A light color and intensity modulation system as claimed in claim 2, further comprising television RF modulator means to convert said color component signals into an RF modulated video signal.

8. A light color and intensity modulation system as claimed in claim 1, wherein said intensity control signal includes, in addition to said component F being a first component, a second component, said second component controlling a scaling factor of said output of said low frequency oscillator, said intensity modulation signal being determined by a difference given by a maximum product of said output of said low frequency oscillator and said scaling factor less an instantaneous product of said output of said low frequency oscillator and said scaling factor.

9. A light color and intensity modulation system as claimed in claim 8, wherein said intensity control signal further includes a third component, said third component controlling an intensity factor of said intensity modulation signal, such that said intensity modulation signal is the product of said intensity factor and said difference.

10. A light color and intensity modulation system as claimed in claim 1, further comprising power linearization means to scale an unscaled amplitude of said plurality of color component signals to produce a scaled amplitude, so that a relation between the unscaled amplitude and an intensity of corresponding colors projected by said color light projector is linear.

11. A light color and intensity modulation system as claimed in claim 10, further comprising power dimmer means receiving said scaled amplitude of said plurality of color component signals to produce a variable power, color projector lamp signal.

12. A light color and intensity modulation system as claimed in claim 1, further comprising power dimmer means receiving said plurality of color component signals to produce a variable power, color projector lamp output signal.

* * * * *